Feb. 26, 1946.  W. F. PECK  2,395,577
OPTICAL INSTRUMENT
Filed May 11, 1943  3 Sheets-Sheet 1
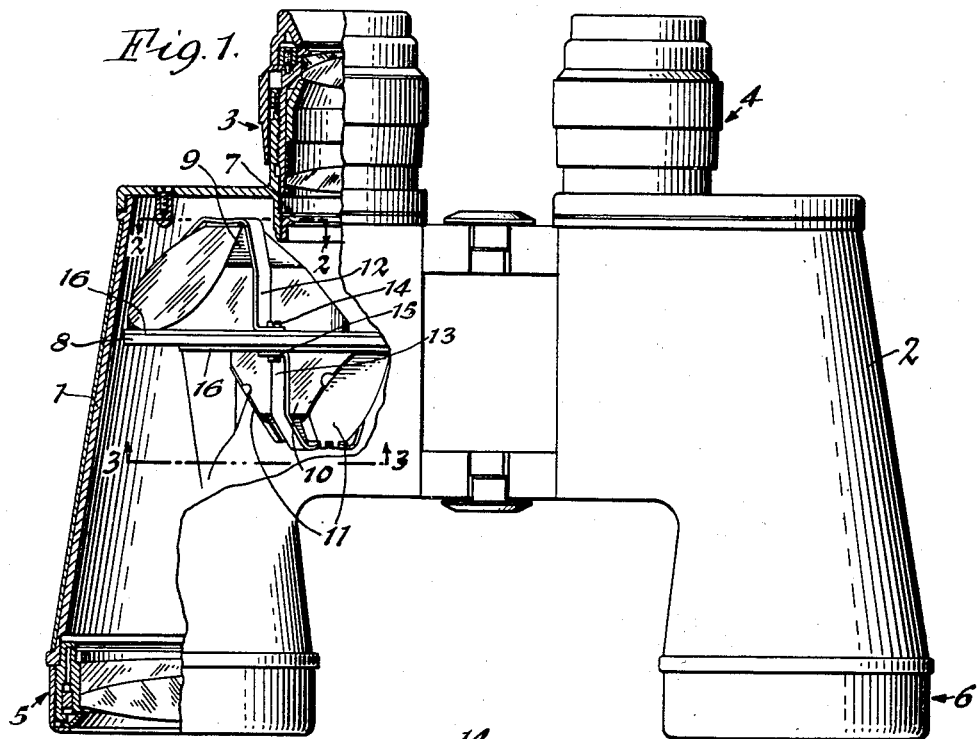
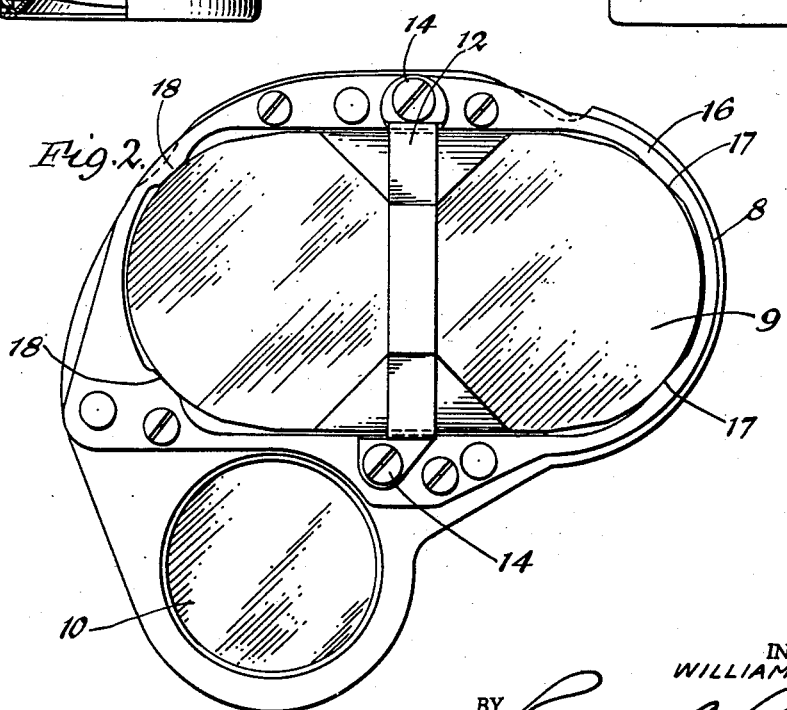
INVENTOR.
WILLIAM F. PECK
BY Raymond A. Paquin
ATTORNEY Feb. 26, 1946.   W. F. PECK   2,395,577
OPTICAL INSTRUMENT
Filed May 11, 1943   3 Sheets-Sheet 2
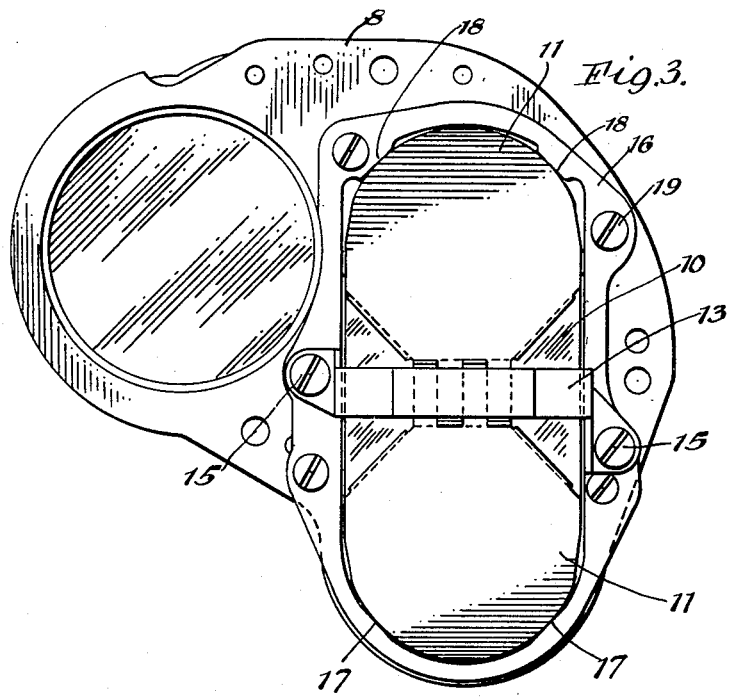
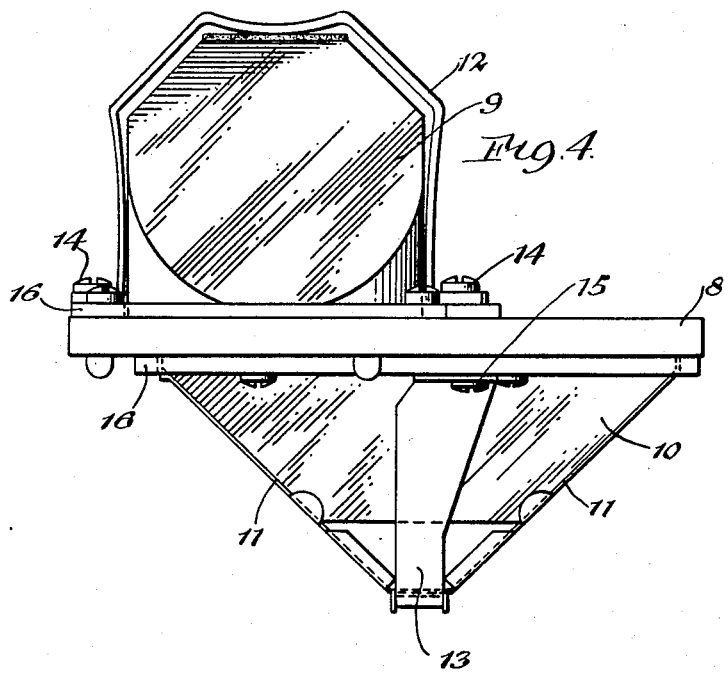
INVENTOR.
WILLIAM F. PECK
BY Raymond A. Paquin
ATTORNEY

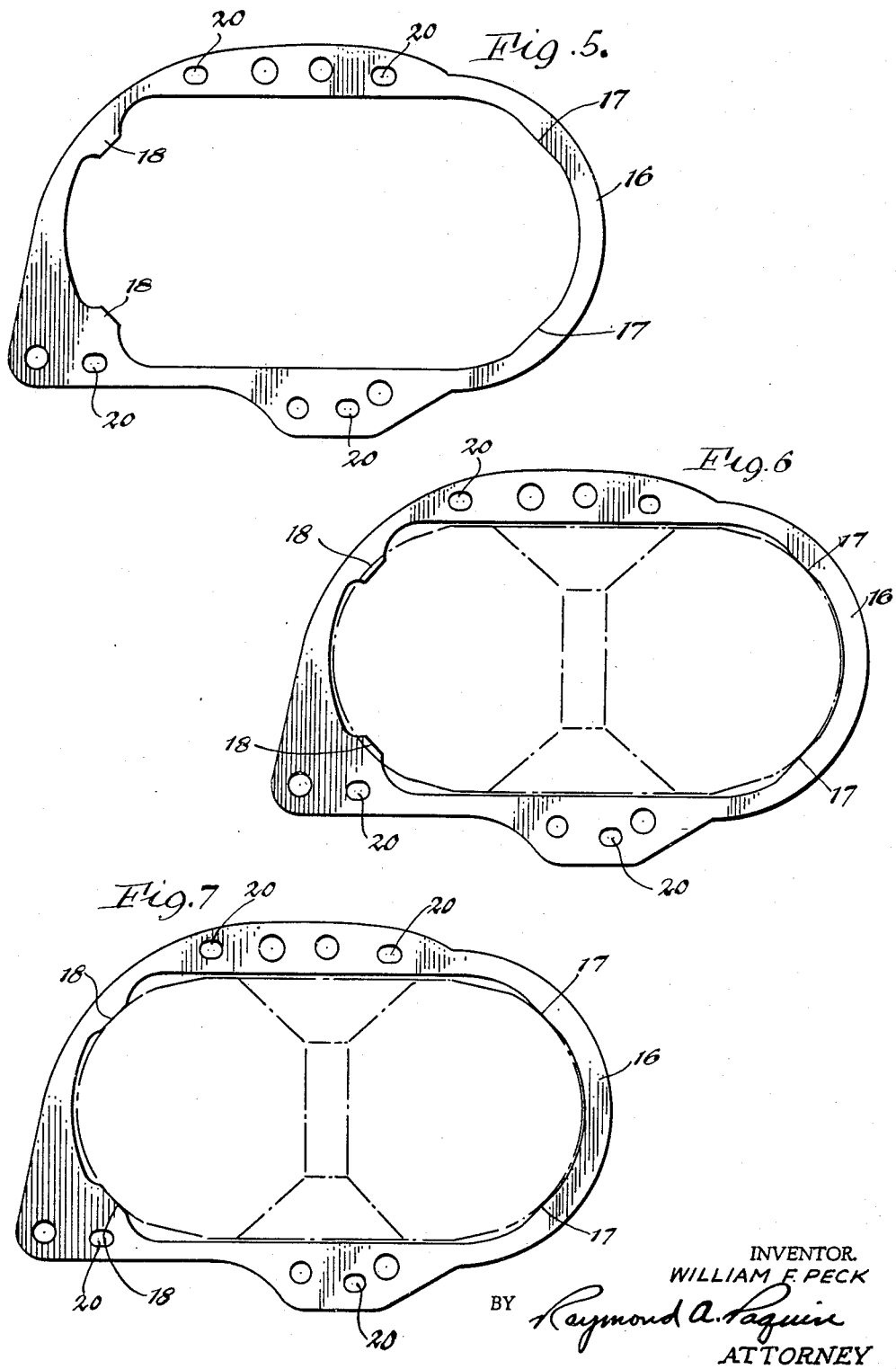

Patented Feb. 26, 1946

2,395,577

UNITED STATES PATENT OFFICE 2,395,577

OPTICAL INSTRUMENT

William F. Peck, Buffalo, N. Y., assignor, by mesne assignments, to American Optical Company, Southbridge, Mass., a voluntary association Application May 11, 1943, Serial No. 486,529

2 Claims. (Cl. 88—33)

This invention relates to optical instruments and more particularly to a new and improved means for retaining optical elements in aligned position.

An object of the invention is to provide a new and improved means for retaining an optical element in adjusted aligned position.

Another object of the invention is to provide a new and improved means for mounting an optical element and securing said optical element in said aligned position.

Another object of the invention is to provide a new and improved means for supporting an optical element which means may be adjusted to fit the particular optical element and also adjustably mounted to retain said optical element in aligned position.

Another object of the invention is to provide a new and improved process of fitting an optical element to its mount wherein the mount is particularly adapted for the particular optical element.

Other objects and advantages will be apparent from the following specification taken in connection with the accompanying drawings. It will be understood that many changes may be made in the details of construction, arrangement of parts and steps of the process without departing from the scope of the invention as expressed in the accompanying claims. I therefore do not wish to be limited to the exact details of construction, arrangement of parts and steps of the process shown and described as the preferred form has been shown by way of illustration only.

Referring to the drawings:

Fig. 1 is a plan view partly in section of a prism binocular constructed according to the invention.

Fig. 2 is a sectional fragmentary view on an enlarged scale taken on line 2—2 of Fig. 1 looking in the direction of the arrows.

Fig. 3 is a sectional view on an enlarged scale, taken on line 3—3 of Fig. 1 looking in the direction of the arrows.

Fig. 4 is an end view of the prism support member shown in Figs. 2 and 3.

Fig. 5 is a plan view of one of the retaining means shown in one step of the process.

Fig. 6 is a view similar to Fig. 5 but showing a further step in the process; and Fig. 7 is a view similar to Figs. 5 and 6 but showing a further step in the process.

In the past considerable difficulty has been encountered in positioning elements such as the prisms of a prism binocular in adjusted aligned relation with each other and with the other elements of the optical system of the instrument in such aligned relation whereby said optical elements will not become out of alignment due to shocks or the like during the use of the instrument and whereby the prisms will be strain free in their mounting which will obviate the possibility of damage or breakage to the prisms.

Among the difficulties encountered was the fact that due to tolerances in the manufacture of the prisms the prisms were not of exactly the same size and therefore the mounts did not always exactly fit the particular prism and therefore where the mounting was too tight, strain was set up in the prism which was liable to cause damage thereto or else due to looseness between the prism and retaining means the prism was free to move in its retaining means and was not permanently retained in accurate optical alignment as was necessary for the proper functioning of the instrument.

It therefore is an object of the present invention to provide a new and improved means and process of fitting and positioning optical elements in aligned relation whereby said elements are mounted strain free and are permanently secured in aligned position.

Referring more particularly to the drawings wherein similar reference characters designate corresponding parts throughout the several views, the invention is shown applied, for the purpose of illustration only, to a prism binocular, and it will be understood that it may be applied to other devices as well without departing from the scope thereof. The instrument embodying the invention comprises a pair of casings 1 and 2 each having an eyepiece 3 and 4 respectively adjacent one end thereof and an objective 5 and 6 respectively adjacent the opposed end thereof.

As shown in section in Fig. 1, the eyepieces 3 and 4 are each adapted to contain the eyepiece optical system and to have the reticule 7 aligned therewith and the objectives 5 and 6 are each adapted to contain the objective lens system.

In each of the casings 1 and 2, is provided a prism plate or support 8 adapted to support a pair of prisms 9 and 10 one on either side of said support 8 and with the prism 9 having a portion optically aligned with the objective lens system and a second portion optically aligned with a portion of the prism 10 which prism also has a second portion optically aligned with the optical system of the eyepiece 3 whereby light entering the objective will be seen through the eyepiece.

From the above it will be seen that it is necessary that the prisms 9 and 10 be accurately in alignment with each other and also with the other elements of the optical system and that they be permanently retained in said aligned relation.

Over the outer prism 10 is placed a light shield or the like 11 to prevent the entrance of stray light into the eyepiece which would interfere with vision through the instrument.

The prisms 9 and 10 are secured on the opposite surfaces of said prism plate or support 8 by means of straps or the like 12 and 13 respectively which straps are secured to the prism plate or support 8 by means of screws or the like 14 and 15 respectively.

In order to retain said prisms in aligned relation on opposite sides of said plate or support 8 there is provided a pair of collar members or retaining members 16 with one of said collar members 16 being provided for each of said prisms and with each said collar member adapted to surround a prism and retain the same in adjusted aligned position. The collar members are each provided with the spaced bearing points 17 adjacent one end thereof and adapted to engage spaced portions of the periphery of the prism member and retain said prism member in spaced relation with the periphery of said collar member, thus providing a strain free mounting for said prism. It is pointed out that any desired number of said spaced bearing portions 17 may be provided.

Adjacent the opposite end of each collar member 16 are provided the integral spaced bearing portions 18 which portions are adapted to be fitted to the particular prism to be mounted in the collar member. This may be done by placing one end of the prism in engagement with the bearing portions 17 on the collar 16 and allowing the other end of said prism to extend over the bearing portions 18 as shown in Fig. 6, and then with a scribing tool or the like marking said bearing portions 18 around the periphery of the overlying portions of the prism, and then removing the prism and filing or otherwise cutting the bearing points, preferably tangent to the marking of the scribing tool or to fit the contour of the prism, so that the prism will fit snugly within the collar 16 and engage the collar 16 only at the points 17 and 18 as shown in Fig. 7.

The prism and collar assembly is then mounted on the prism plate 8 and secured thereon by means of the strap 12 or 13 and the screws 14 or 15 depending upon which prism is being mounted.

Each prism and collar assembly is then adjusted until the prisms are optically aligned with the other elements of the optical system and then screws or the like 19 which are placed through the holes 20 are tightened to retain the collars and prisms in said adjusted position.

It is pointed out that the only members contacting the periphery of the prism are the bearing members 17 and 18 and that a clearance or space is preferably provided between the edge of the prism and collar at all other points.

It is pointed out that as shown in the drawings the holes 20 through the collar 16, through which the screws 19 extend are larger than the diameter of the body of the screws 19 which allows the adjustment of the collar 16 to align the prism as previously described about said screws 19 after which said screws may be tightened to retain the collar in adjusted position on the plate 8 and thereby retain the prism in optical alignment as previously described.

From the foregoing it will be seen that I have provided simple, efficient and economical means and process for obtaining all of the objects and advantages of the invention.

Having described my invention, I claim:

1. A retaining member for positioning a prism of a prism binocular relative to a prism plate for positioning the same in the optical system of said binocular, said retaining member being in the form of a substantially flat endless rigid collar for completely surrounding the adjacent peripheral surface of the prism to be associated therewith and having the greater portion of its endless inner surface formed so as to be spaced outwardly of the peripheral surface of said prism, said endless collar being provided at spaced points about said endless inner surface with a plurality of relatively small inwardly extending integral projections, at least one of said projections being over-size to extend inwardly to a location within the general peripheral outline of the prism to be employed therewith and all of said projections extending inwardly at least as far as said peripheral outline and being of abradable material adapted by diminution thereof to form prism bearing portions exactly fitting said prism, said exact fit being such as to allow movement of the prism in a direction substantially normal to the general plane of said endless collar for assembly or removal thereof relative to said collar, said collar also being provided with a plurality of over-size screw holes for permitting lateral adjustment of the collar and the associated prism to an initial predetermined position relative to said prism plate.

2. In a binocular the combination of a prism supporting plate, a relatively flat retaining member in the form of an endless rigid collar positioned adjacent said supporting plate, a plurality of over-size screw holes formed in said endless collar and a plurality of screws extending therethrough and into said supporting plate for allowing lateral adjustments of the endless collar relative to the supporting plate and for securing said collar in a predetermined adjusted position upon said supporting plate, and a prism within said endless collar and retained thereby against lateral movement relative to said collar, said collar having the greater portion of its endless inner surface formed so as to be spaced outwardly of the adjacent peripheral surface of said prism and being provided at spaced points about said endless inner surface with a plurality of inwardly extending integral projections providing contact areas closely engaging adjacent portions of the peripheral surface of said prism, said contact areas being relatively small so that they may be easily initially reduced in a conventional manner to provide said close fit with said prism, the distance between one pair of adjacent contact areas being of a length different than the distance between any other adjacent pair of contact areas to insure proper orientation of said prism in said collar when secured in adjusted position upon said supporting plate, and said contact surfaces on said projections being arranged substantially normal to the supporting plate, whereby said prism may be readily removed when desired from said endless collar without disturbing the predetermined adjustment of said collar relative to said plate, and when replaced in said collar it can only be inserted in its proper predetermined position therein.

WILLIAM F. PECK.